No. 656,722. Patented Aug. 28, 1900.
J. KRAUS.
TOOTH FOR HARROWS.
(Application filed Feb. 4, 1899.)

(No Model.)

WITNESSES:
T. Benjamin
D. W. McMahon.

INVENTOR:
Johann Kraus
by B. Singer
atty.

THE NORRIS PETERS CO., PHOTO-LITHO., WASHINGTON, D. C.

UNITED STATES PATENT OFFICE.

JOHANN KRAUS, OF SCHWABMÜNCHEN, GERMANY.

TOOTH FOR HARROWS.

SPECIFICATION forming part of Letters Patent No. 656,722, dated August 28, 1900.

Application filed February 4, 1899. Serial No. 704,492. (No model.)

*To all whom it may concern:*

Be it known that I, JOHANN KRAUS, a subject of the Emperor of Germany, residing at Schwabmünchen, in the Kingdom of Bavaria and Empire of Germany, have invented certain new and useful Improvements in Teeth for Harrows, of which the following is a full, clear, and exact description.

The object of my present invention is an improvement in teeth for harrows; and it consists chiefly in an alteration in the form thereof.

A tooth of the kind produced according to this invention is illustrated in the accompanying drawings.

Figure 1:
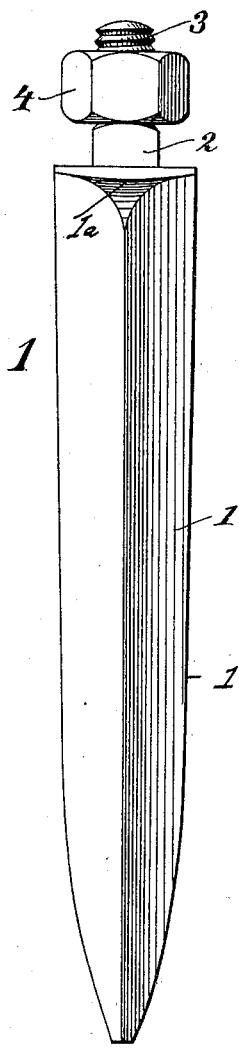
Figure 2:
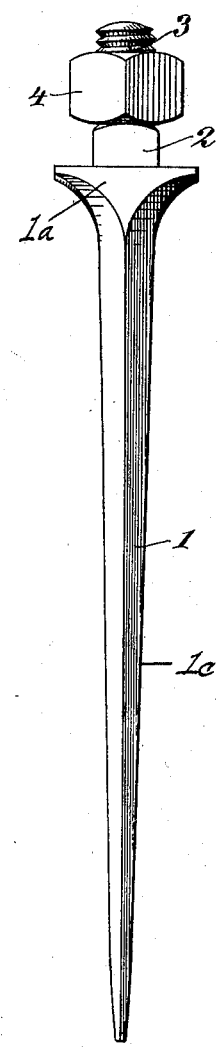
Figure 3:
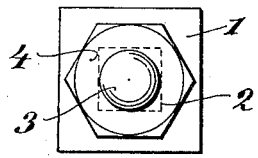

Figure 1 is a front view; Fig. 2, a side view, and Fig. 3 a plan.

The hitherto-used harrow-teeth are generally round or square in cross-section, which forms have many disadvantages. The cutting effect of such teeth is very inconsiderable, so that the clods of earth which have been set loose by the plow are not cut up or broken to pieces; but hard clods are often pushed forward by the harrow. A harrow-tooth made in accordance with my invention presents the general form of a dagger in which there are four cutting edges or blades and in which there is a gradual taper from the upper portion of the tooth to its point.

Referring to the drawings it will be seen that the tooth consists of a main or body portion 1, having a shoulder $1^a$ at the upper end, and an extension 2, a portion of which is threaded, as at 3, for the reception of a nut 4. In the cross-section $x$ $x$ of Fig. 1 the tooth is broad, with its edges parallel throughout the major portion of the length of the tooth, but tapering near the point. In the cross-section $y$ $y$, Fig. 2, the tooth is thin and tapers gradually from the shoulder to the point. Between the edges $1^b$ and $1^c$ the body of the tooth is longitudinally grooved or concaved, thus prolonging the life of the blade form or knife-edge character of the tooth notwithstanding the continued wear or abrasion to which it may be subjected. The shank or extension 2 and the nut 4 are used for securing the tooth to a harrow-frame, as will be readily understood.

Having thus described my invention, what I claim, and desire to secure by Letters Patent, is—

1. A harrow-tooth having one of its cross diameters broad and the other narrow, and with oppositely-disposed longitudinal grooves forming cutting edges or blades on said tooth, substantially as set forth.

2. A harrow-tooth having one of its cross diameters broad and the other narrow, and with oppositely-disposed longitudinal grooves forming cutting edges or blades, and a shoulder and an extension at the upper end of the tooth, substantially as set forth.

In witness whereof I subscribe my signature in presence of two witnesses.

JOHANN KRAUS.

Witnesses:
TH. A. JUN, Jr.
BABETTE SCHARPF.